(12) United States Patent
Sharman et al.

(10) Patent No.: US 10,863,176 B2
(45) Date of Patent: Dec. 8, 2020

(54) INTRA ENCODING AND DECODING WITH VARIABLE INTRA PREDICTION DIRECTION SETS

(71) Applicant: Sony Corporation, Tokyo (JP)

(72) Inventors: Karl James Sharman, Newbury (GB); Nicholas Ian Saunders, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/301,289

(22) PCT Filed: Apr. 20, 2017

(86) PCT No.: PCT/GB2017/051096
§ 371 (c)(1),
(2) Date: Nov. 13, 2018

(87) PCT Pub. No.: WO2017/203203
PCT Pub. Date: Nov. 30, 2017

(65) Prior Publication Data
US 2020/0029076 A1    Jan. 23, 2020

(30) Foreign Application Priority Data
May 23, 2016   (GB) .................................. 1609015.1

(51) Int. Cl.
*H04N 19/119* (2014.01)
*H04N 19/122* (2014.01)
(Continued)

(52) U.S. Cl.
CPC ......... *H04N 19/119* (2014.11); *H04N 19/122* (2014.11); *H04N 19/139* (2014.11); *H04N 19/593* (2014.11)

(58) Field of Classification Search
CPC .. H04N 19/119; H04N 19/139; H04N 19/122; H04N 19/593
See application file for complete search history.

(56) References Cited

U.S. PATENT DOCUMENTS

| | | | |
|---|---|---|---|
| 2012/0014444 A1* | 1/2012 | Min | ........................ H04N 19/14 |
| | | | 375/240.12 |
| 2012/0082222 A1 | 4/2012 | Wang et al. | |

(Continued)

FOREIGN PATENT DOCUMENTS

WO    WO 2013/023518 A1    2/2013

OTHER PUBLICATIONS

International Search Report and Written Opinion dated Oct. 23, 2017 in PCT/GB2017/051096 Filed Apr. 20, 2017.
(Continued)

*Primary Examiner* — Nam D Pham
(74) *Attorney, Agent, or Firm* — Oblon, McClelland, Maier & Neustadt, L.L.P.

(57) ABSTRACT

An apparatus includes: an image encoder to encode an image as a plurality of image regions, the image encoder selecting at least one of the size and the shape of each image region; and an intra-image predictor to predict a current sample of a current region of an image with respect to one or more reference samples of the same image according to a prediction direction between the current sample and a reference position amongst the reference samples; in which the prediction direction is selected from a set of candidate prediction directions; the intra-image predictor being configured to apply two or more different sets of candidate prediction directions in dependence upon an aspect of the image region, the aspect being one of more of: the region shape and the position of the region within the image. Optionally the aspect further includes the region size.

22 Claims, 12 Drawing Sheets

(51) Int. Cl.
*H04N 19/139* (2014.01)
*H04N 19/593* (2014.01)

(56) References Cited

U.S. PATENT DOCUMENTS

2013/0136175 A1* 5/2013 Wang .................... H04N 19/11
375/240.12
2014/0140404 A1 5/2014 Liu et al.

OTHER PUBLICATIONS

Tabatabai, A. et al., "HM2 Chroma Intra Coding Description", Sony, MediaTek, HKUST, Joint Collaborative Team on Video Coding (JCT-VC) of ITU-T SG16 WP3 and ISO/IEC JTC1/SC29/WG11, No. m19931, JCTVC-E395, XP030048498, 2010, 3 pages.

Francois, E. et al.,"Non-SCE1: simplification of intra mode coding in SHVC", JCTVC-M0115, JCT-VC 13$^{th}$ Meeting, Apr. 2013, 6 pages.

Choi, K. et al., "IVC-CE2: Intra prediction improvement for IVC CE2, Hanyang University", International Organisation for Standardisation ISO/IEC JTC1/SC29/WG11 Coding of Moving Pictures and Audio, No. m29261, XP030057793, Apr. 2013, 7 pages.

Shiodera, T. et al., "Block Based Extra/Inter-Polating Prediction for Intra Coding", ICIP 2007, IEEE International Conference on IEEE, XP031158358, 2007, pp. VI-445 to VI-448.

Zou, F. et al., "Edge-Based Adaptive Directional Intra Prediction", 28th Picture Coding Symposium, PCS2010; Dec. 8-10, XP030082005, 2010, pp. 366-369.

Tsukuba, T. et al., "Adaptive multidirectional intra prediction", 33rd Meeting, ITU—Telecommunications Standardization Sector, Study Group 16, Video Coding Experts Group (VCEG), No. VCEG-AG05, XP030003609, Oct. 20, 2007, pp. 1-6.

Bross, B. et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, Feb. 2012, 259 pages.

* cited by examiner

ID: 10,863,176 B2

INTRA ENCODING AND DECODING WITH VARIABLE INTRA PREDICTION DIRECTION SETS

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Current video codecs (coder-decoders) such as those used in H.264/MPEG-4 Advanced Video Coding (AVC) achieve data compression primarily by only encoding the differences between successive video frames. These codecs use a regular array of so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
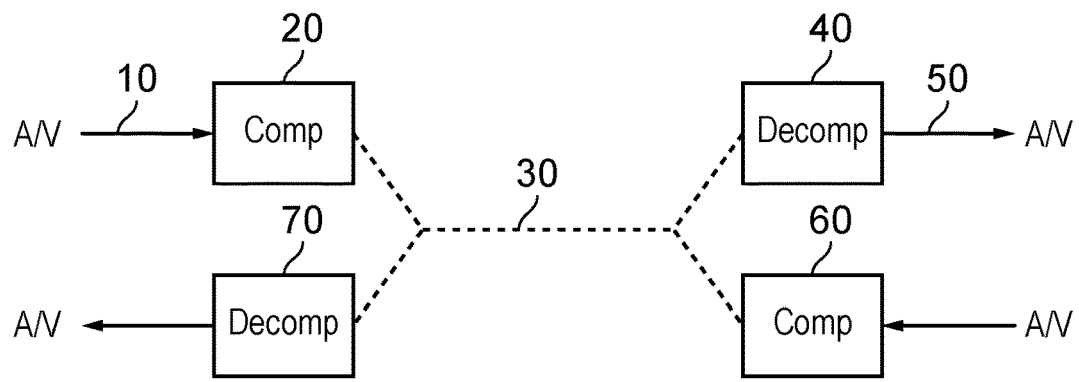
FIG. 1 schematically illustrates an audio/video (AN) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
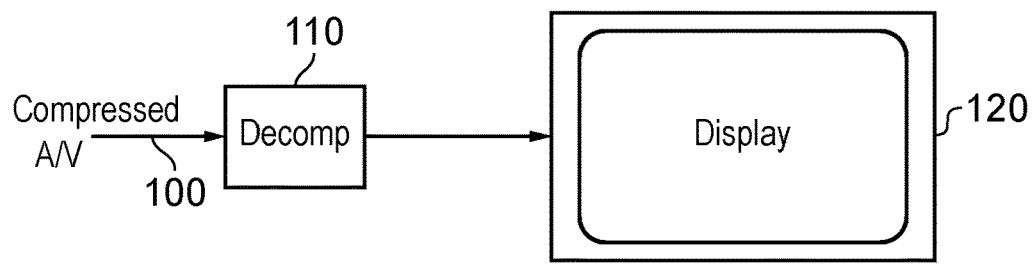
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
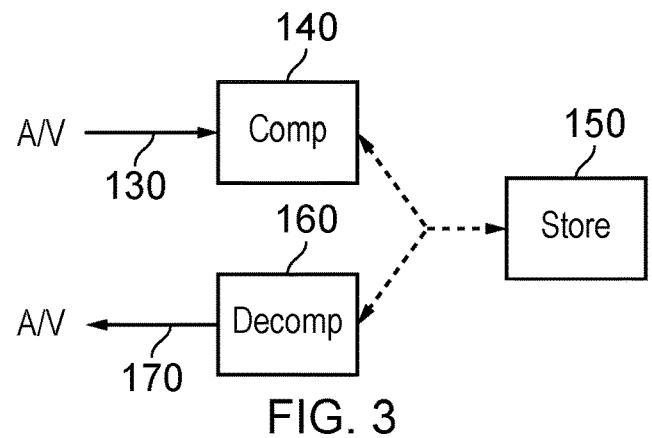
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
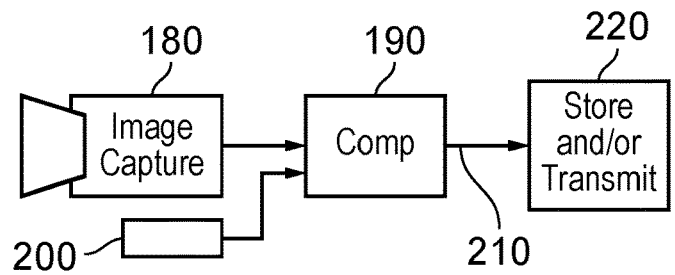
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 5:
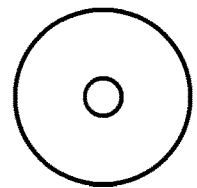
FIGS. 5 and 6 schematically illustrate storage media.
Figure 6:

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Figure 7:
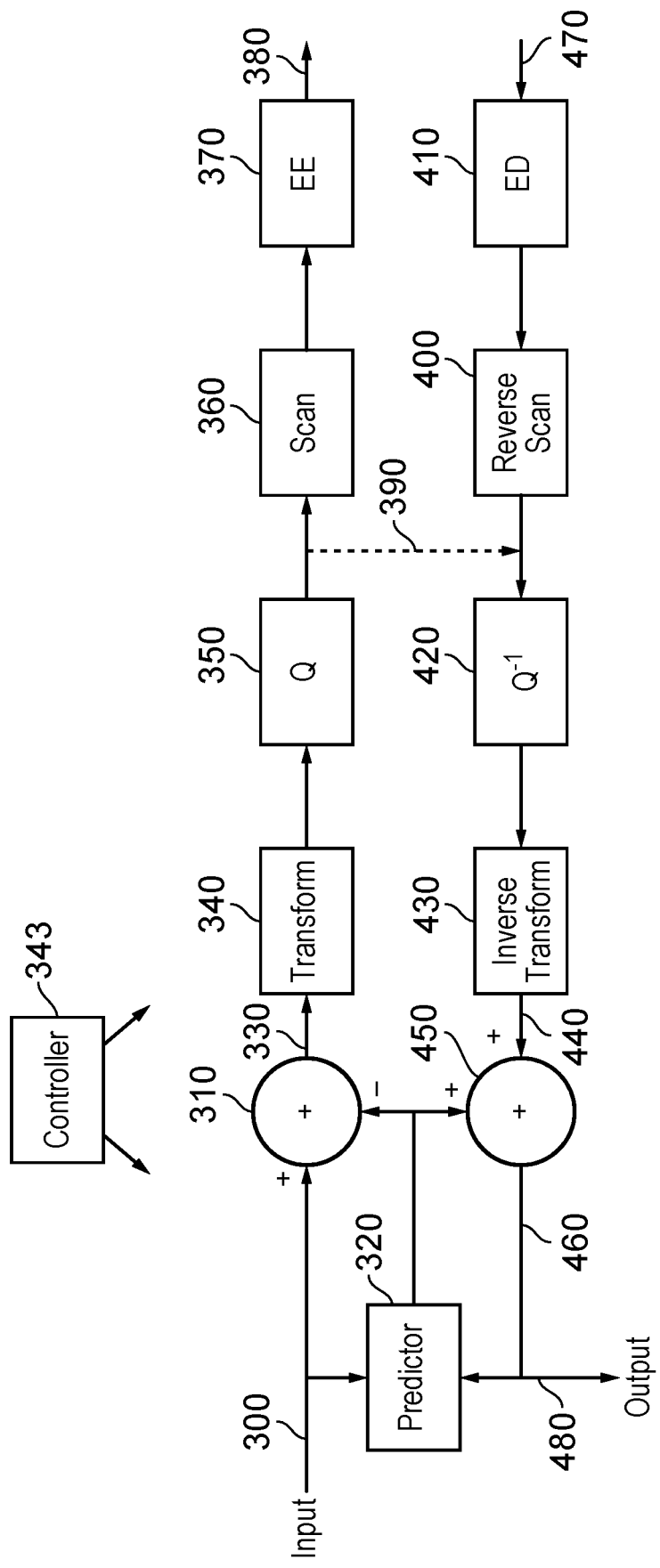
FIG. 7 provides a schematic overview of a video data compression and decompression apparatus.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 form the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
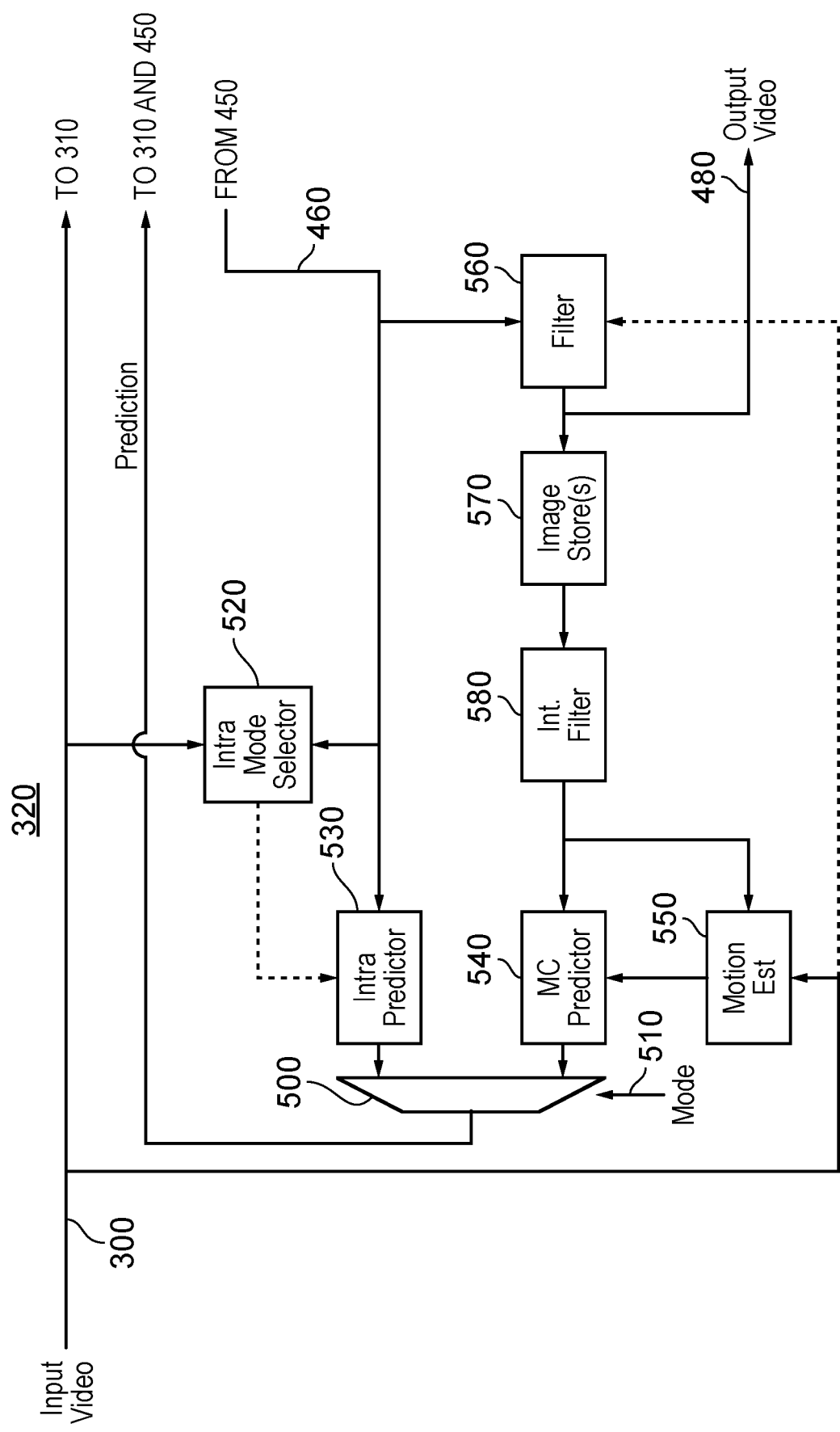
FIG. 8 schematically illustrates a predictor.

The apparatus of FIGS. 7 and 8 can act as a compression apparatus or a decompression apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in Bross et al: "High Efficiency Video Coding (HEVC) text specification draft 6", JCTVC-H1003_d0 (November 2011), the contents of which are incorporated herein by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
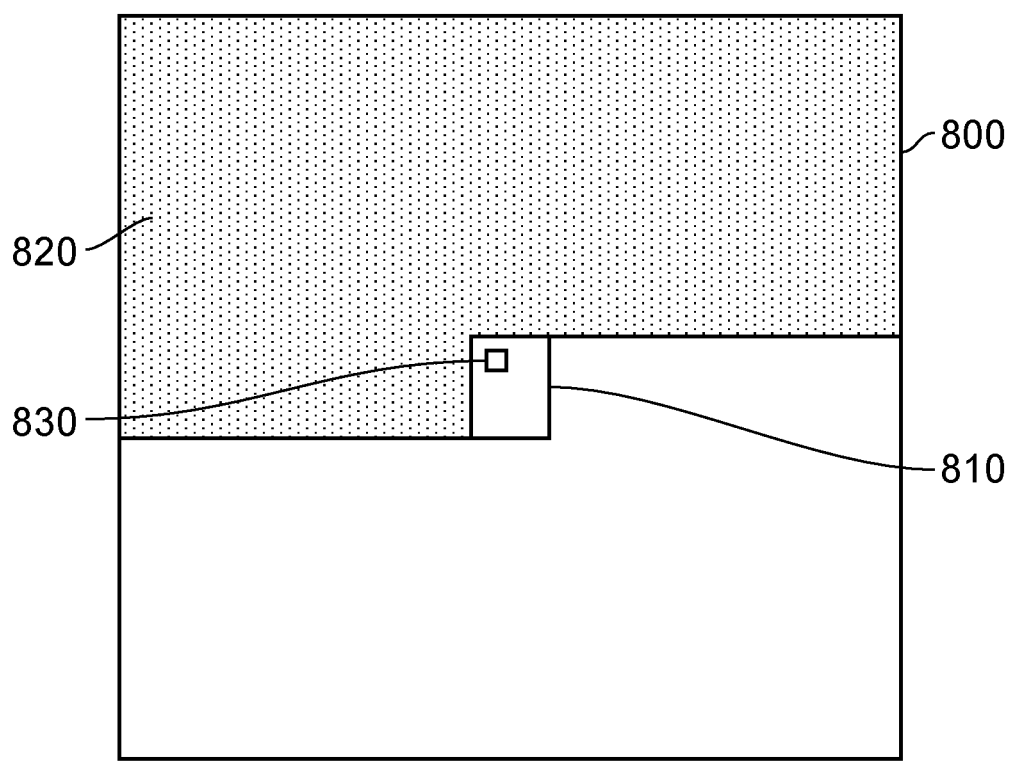
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of eth same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
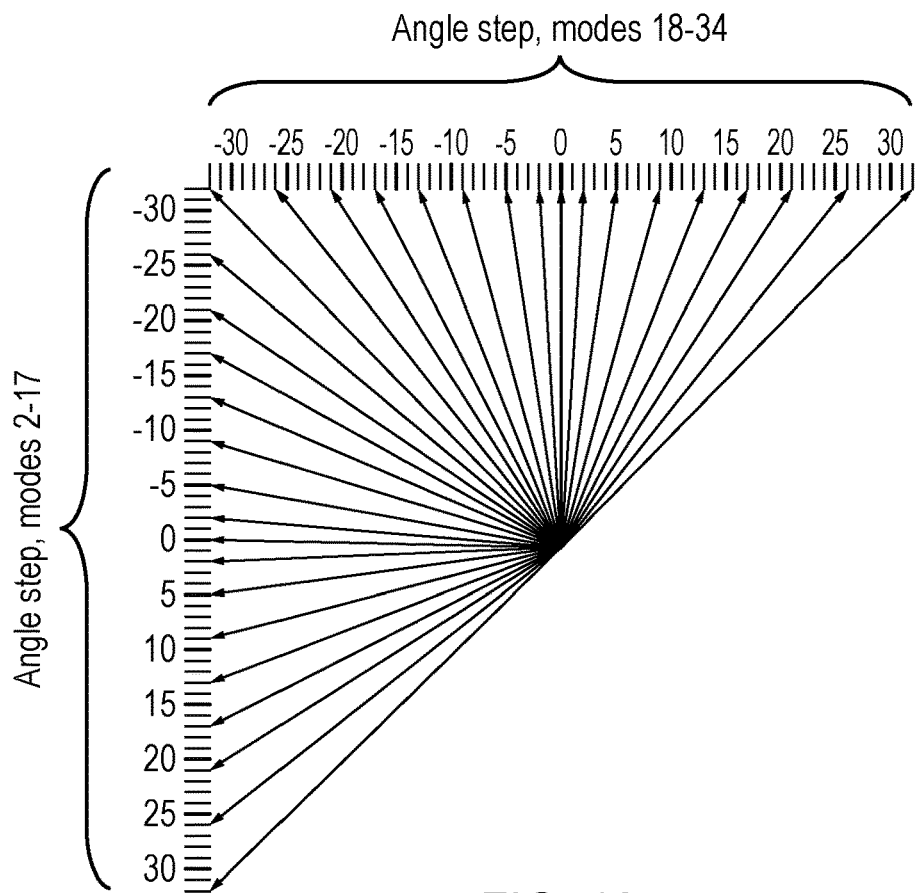
FIG. 10 schematically illustrates a set of possible intra-prediction directions.
Figure 11:
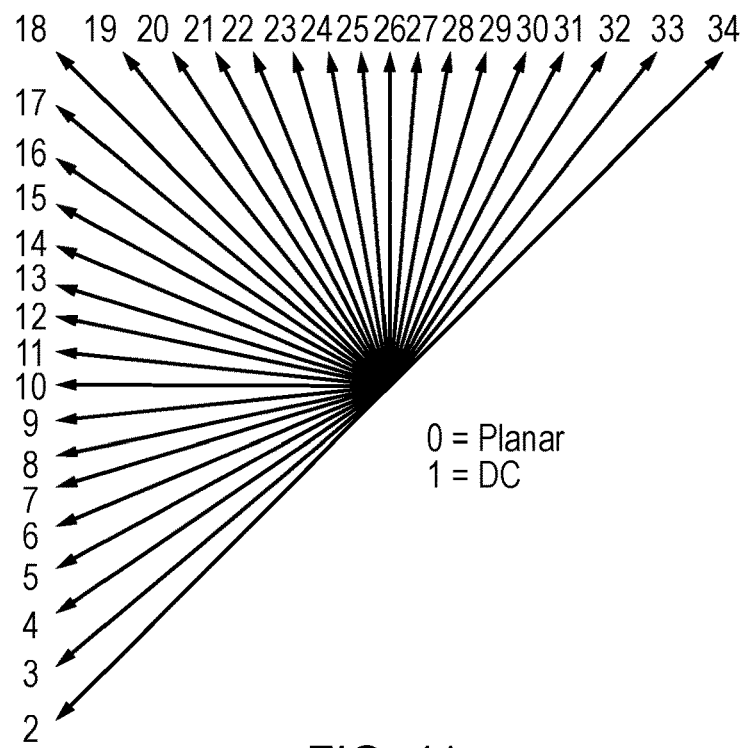
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image.

Figure 12:
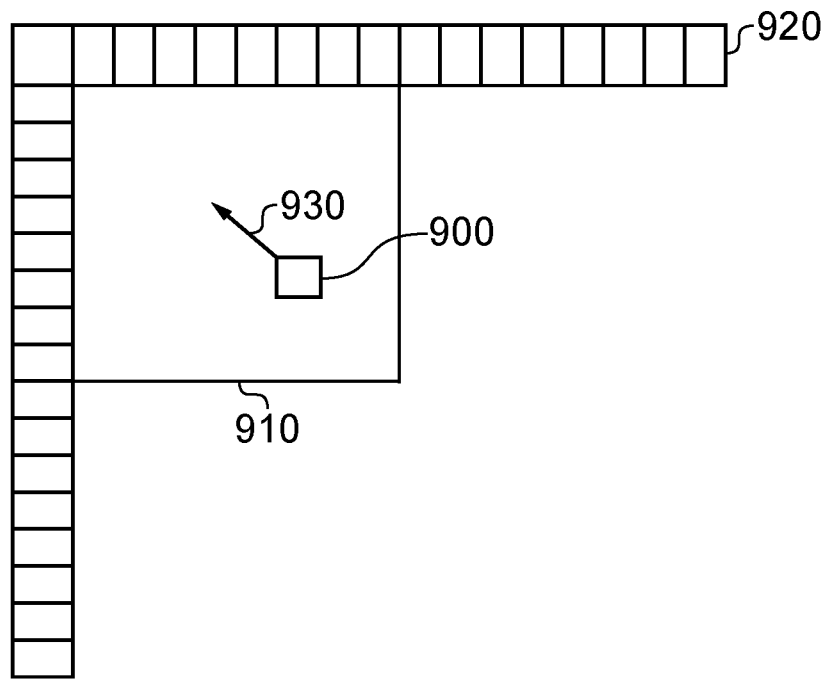
FIG. 12 schematically illustrates an intra-prediction process.

FIG. 12 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 12 or could be another shape such as rectangular.

Figure 13:
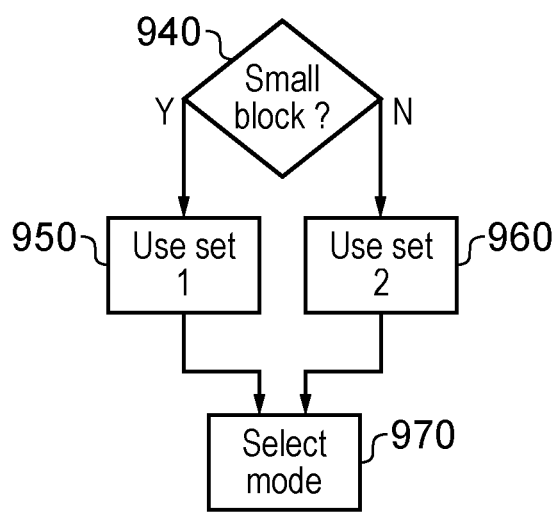
FIG. 13 is a schematic flowchart illustrating a mode selection method.

Rather than allowing any sample in any block to select from the entire set of possible intra-prediction modes shown in FIG. 11, techniques will be described below for restricting the set of intra-prediction modes which can be selected from, for at least some situations but not for other situations. A basic example process of this type is shown in FIG. 13 which is a schematic flow chart illustrating a mode selection method. FIG. 13 forms part of a broader prediction, compression or decompression algorithm and simply relates to a part of the process associated with selecting a mode.

At a step 940, it is determined whether the block (such as the block 910) containing the sample in question is a so-called "small" block. Here, the block in question is a block to which intra-prediction is being applied, such as a block referred to as a TU in the discussion above. For example, a "small" block could be defined as a 4×4 block of samples, or a different definition could be used (such as an 8×8 block or smaller). In the case of non-square blocks, a "small" block could be defined as (for example) a block having at least one dimension of 4 or fewer samples. Empirical tests have shown that in the case of square blocks, advantages can be obtained using the present techniques for at least a definition of "small block" as a 4×4 block of samples.

If the current block is classified as a small block, the control passes to a step 950 at which a first set of available modes is provided for selection during the mode selection process. If not, control passes to a step 960 in which a second set of modes is provided for selection. Control then passes to a step 970 at which an appropriate prediction mode is selected in the normal way, but from the relevant set.

The first set (applicable to "small blocks") contains fewer available modes than the second set applicable to non-small blocks.

In some embodiments, bit-rate benefits can be obtained by allowing only a smaller set of modes to be used for small blocks, because the amount of data to encode the identity of the currently selected mode (amongst the set of possible modes) can be smaller when the available set of modes is smaller. For small blocks, however, it is also noted that the difference in prediction accuracy between using a larger or a smaller set of available modes can be zero or trivial. In other words, for small blocks, a set of available prediction modes giving a very fine resolution in direction may not be needed, because the outcome might be the same or very similar for adjacent modes in that fine-resolution set. Therefore, in the case of small block bit-rate savings can potentially be obtained by restricting the set of available prediction modes without necessarily incurring less accurate (or significantly less accurate) predictions.

Figure 14:
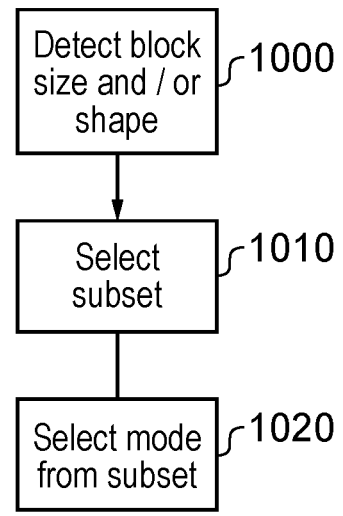
FIG. 14 is a schematic flowchart illustrating a mode subset selection method.

FIG. 14 is a schematic flow chart illustrating a more general case than that of FIG. 13, in which, at a step 1000, an aspect (or multiple aspects) of the block size and/or shape are detected, and in response, at a step 1010, an appropriate subset of the available prediction modes is selected so that, at a step 1020, a mode applicable to a sample within that block can be chosen from the selected subset. The more general process of FIG. 14 encompasses the possibility that multiple different sets or subsets of modes might be made available depending on the detected block aspect (rather than just the two sets in FIG. 13).

The selection of the subset applies to the entire block in these examples (though examples will be given later of situations where this does not apply) and is (in at least these examples) carried out in a sufficiently deterministic manner that the same selection process can take place at the encoder and at the decoder without the need for the transmission of separate data indicating the selected subset. So, for example, in the simple example discussed above, any block size of (say) 4×4 would have a certain subset, whereas other block sizes would have a different set of available prediction modes, and so on. This information is derivable both at the encoder and the decoder without the need for additional information to be sent as part of the bit-stream to define which subset is in use. For example, in an example situation where (say) 4×4 blocks use a smaller set of available modes than other blocks, both the encoder and the decoder would use that smaller subset for any 4×4 block based on predetermined or pre-shared configuration information without the need for an explicit indication from the encoder to the decoder, each time a 4×4 block is handled, that the smaller set is to be used. Similar considerations can apply in respect of the other examples to be discussed below; in each case, the set of available modes in respect of a block is derivable from information which—at the encoding or decoding (as applicable) of that block, is available to the encoder and the decoder.

The encoding arrangements of FIGS. 7 and 8, operating in accordance with the flowcharts of FIGS. 13, and 14, provide an example of an apparatus comprising: an image encoder to encode an image as a plurality of image regions, the image encoder selecting at least one of the size and the shape of each image region; and an intra-image predictor to predict a current sample of a current region of an image with respect to one or more reference samples of the same image according to a prediction direction between the current sample and a reference position amongst the reference samples; in which the prediction direction is selected from a set of candidate prediction directions; the intra-image predictor being configured to apply two or more different sets of candidate prediction directions in dependence upon an aspect of the image region, the aspect being one of more of: the region shape and the position of the region within the image. Optionally the aspect further includes the region size.

Similarly, the decoding arrangements of FIGS. 7 and 8, operating in accordance with the flowcharts of FIGS. 13, and 14, provide an example of an apparatus comprising: an image decoder to decode an image as a plurality of image regions each having a respective size and the shape; and an intra-image predictor to predict a current sample of a current region of an image with respect to one or more reference samples of the same image according to a prediction direction between the current sample and a reference position amongst the reference samples; in which the prediction direction is selected from a set of candidate prediction directions; the intra-image predictor being configured to apply two or more different sets of candidate prediction directions in dependence upon an aspect of the image region, the aspect being one of more of: the region shape and the position of the region within the image. Optionally the aspect further includes the region size.

In the example discussion of FIGS. 13 and 14, the aspect further comprises at least the region size; the intra-image predictor being configured to apply a smaller set of candidate prediction directions to smaller image regions and to apply a larger set of candidate prediction directions to larger image regions. For example, the image predictor can be configured to apply a smaller set of candidate prediction directions to image regions having at least one dimension of a threshold size or lower (such as 4×4 blocks, or non-square blocks having at least one dimension of 4 samples or fewer). Multiple different size thresholds can be used, with corresponding sets of directions available.

Figure 15:
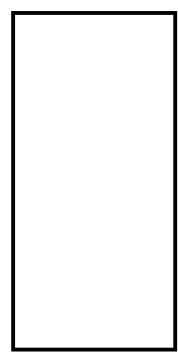
FIGS. 15 and 16 schematically illustrate non-square blocks.
Figure 15:
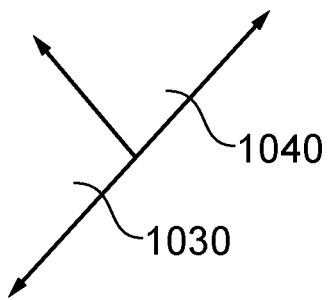
Figure 16:
Figure 16:
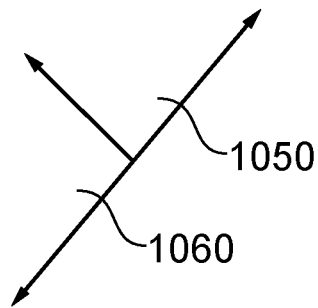

FIGS. 15 and 16 schematically illustrate examples of non-square blocks. Non-square blocks can be used in a general encoding system as part of a block-size and shape selection process carried out to attempt to match the size and shapes of the blocks into which the image is divided to the disposition of image features within the image. Non-square blocks can also be used in situations where the sample resolution is different in the horizontal and vertical directions, such as in the case of some video sampling schemes.

Referring to FIG. 15, a vertical non-square block is provided, and in this instance a subset of modes can be selected so that (a) the overall number of available modes is reduced in comparison to a square block (or at least in comparison to the full set applicable to (for example) a "large" (non-small) square block), but (b) within that reduced number of modes, a greater proportion of the number are provided in a quadrant 1030 than in a quadrant 1040, reflecting the greater number of potential reference samples to the left of the block than above it. Similarly, in FIG. 16, a horizontally oriented rectangular block is provided and the number of modes overall is reduced, with a greater predominance of the remaining modes being provided in a quadrant 1050 than in a quadrant 1060.

Figure 17:
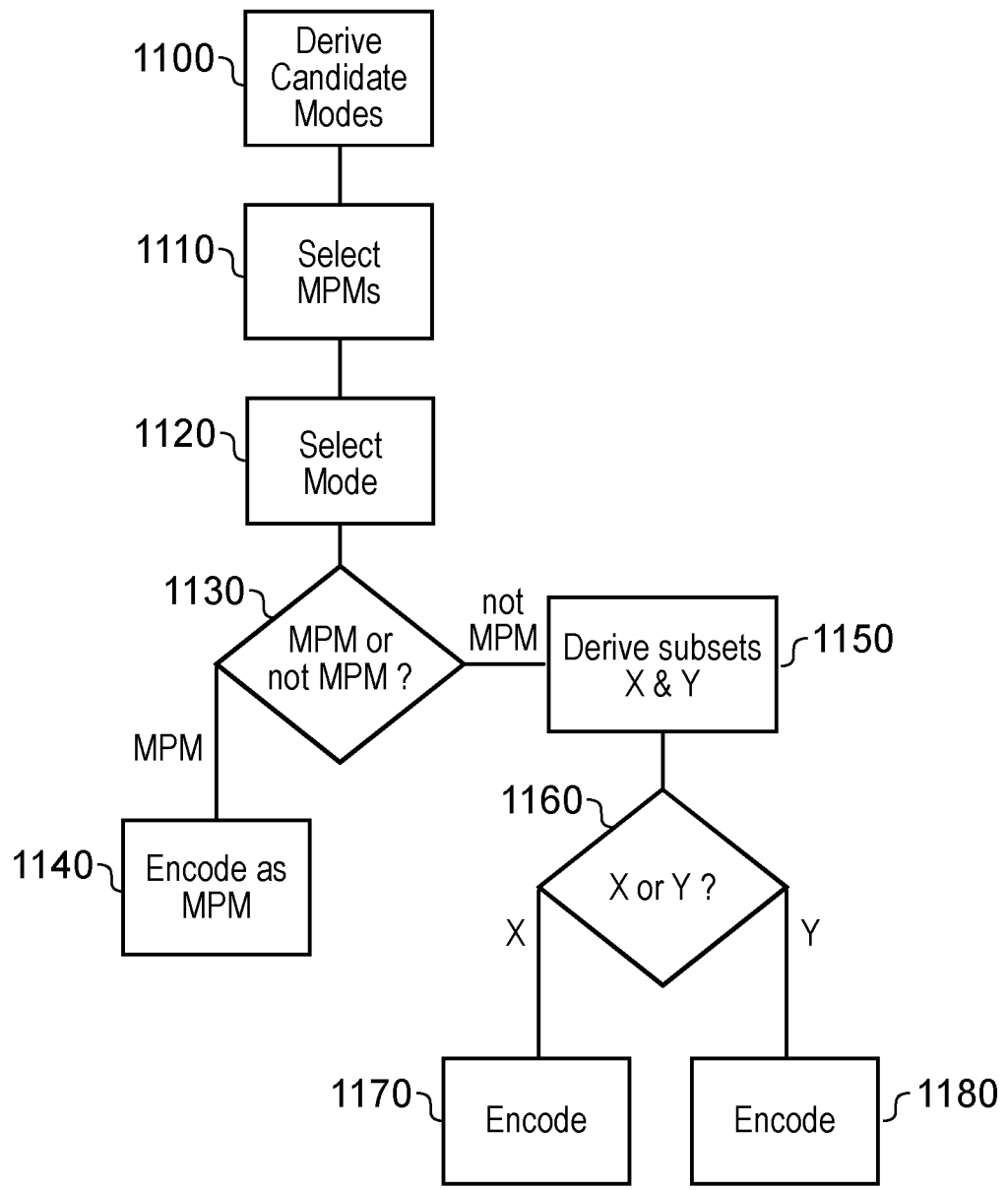
FIG. 17 is a schematic flowchart illustrating a method using most probable modes (MPMs)

In FIGS. 16 and 17, therefore, examples are provided of the aspect comprising at least the region shape (though it may also comprise other features such as size), the intra-image predictor being configured to apply a smaller set of candidate prediction directions to non-square image regions and to apply a larger set of candidate prediction directions to square image regions. For example, the smaller set of candidate prediction directions for a non-square image region may be weighted towards a range of prediction directions dependent upon the orientation of the non-square image region.

FIG. 17 is a schematic flow chart illustrating a method using most probable modes (MPMs).

In some example arrangements, so-called most probable modes are derived from the modes applicable to previously encoded/decoded blocks. The aim of this process is that (a) the derivation of MPMs can be carried out in an identical manner at the encoder during encoding, and at the decoder during decoding, so that both are dealing with the same MPMs for any particular sample, (b) if the image content is similar between the current block and the previously encoded blocks from which the MPMs were derived, there is at least a good chance that samples of the current block will also use an MPM, and (c) a MPM can be encoded with a potentially smaller amount of data in the bit-stream, compared with an arbitrary one of the full set of MPMs. Therefore, for a sample of a current block, a shorter amount of data can be used to encode the chosen mode if it is an MPM derived from one or more previously (for example, preceding) encoded blocks. This is because a short data code can be used to indicate simply that "this sample is using the most probable mode derived by the pre-configured process from the previous blocks" rather than having to specify one mode amongst a group of, for example, 67 modes. So, given that mode selection is often similar within image regions, this can provide an overall saving in bit-rate.

The term "most probable mode" is one used in the art, and is therefore employed here for convenience. "More commonly used mode" would be another possible term for use in connection with these modes. The term MPM does not imply an absolute highest probability that a mode derived from preceding samples will be the most likely to be selected for a particular sample. However, so-called MPMs tend to be modes which are commonly used for preceding samples, or are derived from modes which are commonly used for preceding samples, and so there is generally a higher likelihood that they will be applicable to a current sample.

It is also noted that more than one MPM can be derived. The term "MPM" does not imply that the (more than one) modes are equally most likely, but as a set of two or more MPMs, they are intended to have an increased likelihood of being applicable to the current sample.

The most probable modes are derived from preceding blocks and in particular from the modes selected for samples within those blocks. Referring to FIG. 17, at a step 1100, a set of candidate modes, being modes applicable to samples of the preceding encoded blocks, is derived and at a step 1110 a group of one or more most probable modes is generated, for example as the most common one or more of the candidate modes or modes derived from the most common one or more candidate modes. At a step 1120 a mode is selected for a current sample. At a step 1130, it is detected whether the selected mode is one of the one or more most probable modes or not. If the answer is yes, then the current mode is encoded using a short data code at a step 1140 as a most probable mode.

Note that the process at the step 1120 may involve a selection amongst the entire set of available modes, for example by trial encoding or deriving information indicating encoding efficiency for each mode. But in some examples of encoders, the modes identified as MPMs can be, by virtue of the testing algorithm used at the step 1120, potentially more likely to be selected as the mode for that sample than other, non-most-probable modes. So, the choice of MPM can itself have an influence over which mode is chosen at the step 1120.

In some examples, one MPM might be selected at the step 1110. In other examples, two or more MPMs may be selected, for example an "up" mode and a "left" mode, where the "left" mode might be in the range 2-18 in FIG. 11 and the "up mode" might be a different mode, in the range 18-34 in FIG. 11. Various rules can be applied to the selection of MPMs; as long as these rules are applied identically at the encoder side and the decoder side, the particular rules are not, at a general level, technically significant to the present examples. However, some examples and variants of potential rules will be discussed below.

Returning to FIG. 17, if the currently selected mode for a particular sample is not a most probable mode, then control passes to a step 1150 where the remaining modes of the set of 67 modes are divided into two subsets referred to here as subset "X" and subset "Y". For example, the subset X might be every fourth one of the remaining (not most probable) modes arranged in numerical mode order (FIG. 11), and the subset Y would be formed of the other remaining not most probable modes in numerical order.

At a step 1160 a detection is made as to whether the selected mode is in the subset X or the subset Y and control passes to either a step 1170 or a step 1180 to encode that mode depending on which subset it falls in.

The arrangement of FIG. 17 therefore provides an example of the image encoder being configured to detect one or more likely prediction directions in response to those commonly used for one or more previously encoded image regions and to encode the data identifying the prediction direction as either: (i) data indicating that the prediction direction is a detected likely prediction direction, or (ii) data identifying the prediction direction amongst the remaining candidate prediction directions.

Figure 18:
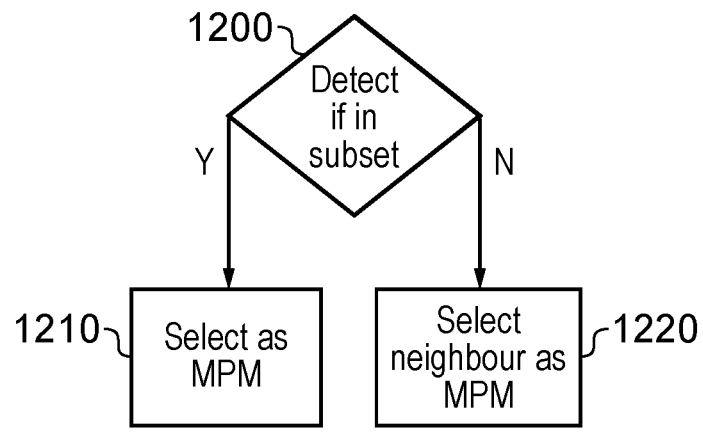
FIG. 18 is a schematic flowchart illustrating an MPM selection method.

Considering the most probable mode operation of FIG. 17 in conjunction with the operations discussed earlier, it is noted that in at least some examples, the "most probable mode" detection will tend to detect a "large block" mode if a preceding block is a large (non-small) block. This can be for reasons as simply as the statistical weighting which will be applied by the larger number of samples in the preceding large block. In any event, noting that for at least some block sizes and/or block shapes fewer than the full set of prediction modes is made available, FIG. 18 provides a schematic flow chart illustrating a way of handling the situation that a most probable mode (as detected from the preceding block(s)) might not in fact be in the subset available for use in a current block. In an example, this could happen if the most probable mode were derived from the mode applicable to samples in a preceding large block, whereas the current sample is in a small block such that that particular mode is not an available mode for use with the small block.

Referring to FIG. 18, at a step 1200 it is detected whether a candidate mode (from the step 1100) is in the subset applicable to (that is to say, available for use in connection with) the current block size. If yes, then the candidate mode (assuming it meets the other requirements to become a most probable mode) is selected as a most probable mode at a step 1210. If not then at step 1220 a mode which neighbours (in the angle domain) the candidate mode is selected as a most probable mode, again assuming that the candidate would have met the requirements for selection. A rule can be used to make the selection of a neighbour, given that most modes have two neighbours. For example, the nearest available mode could be selected if one available mode is nearer than any other, or if not the next-lowest numbered available mode could be selected at the step 1220.

In other words, in examples, for a given image region having a smaller set of candidate prediction directions than one or more other image regions, the image encoder is configured, when a detected likely prediction direction is not part of the set of candidate prediction directions applicable to the given image region, to map the detected likely prediction direction to an adjacent prediction direction within the set applicable to the given image region.

Referring to the discussion of the subsets X and Y, in examples the data (ii) identifying the prediction direction amongst the remaining candidate prediction directions comprises an indication of whether the prediction direction is in one of two or more differently-sized complementary sub-groups of the remaining candidate prediction directions.

Figure 19:
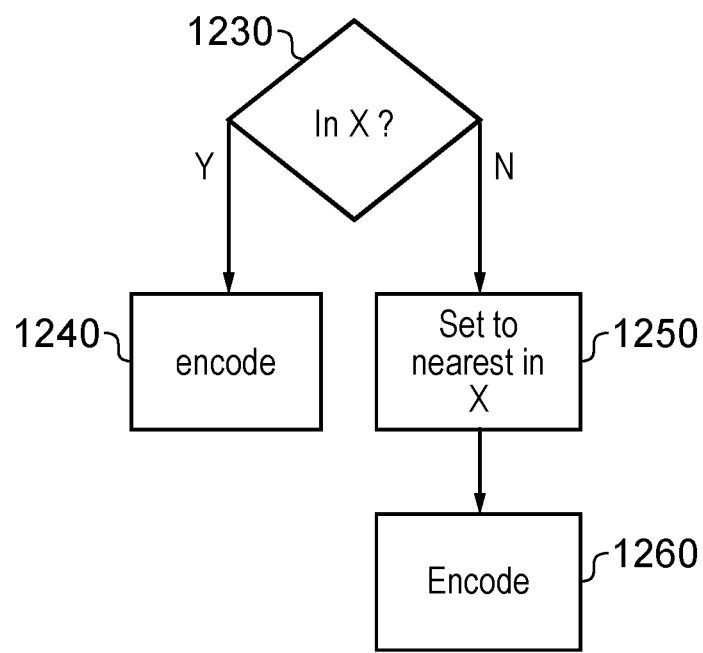
FIG. 19 is a schematic flowchart illustrating an encoding technique.

In the case of small blocks or other instances where the selection of modes is reduced compared to the full set of otherwise available modes, one way to achieve this restriction of the number of available modes is simply to prevent the use of the subset Y referred to in FIG. 17. However, in order to do this, once again a mechanism needs to be provided to cope with the fact that the selected mode (selected at the step 1120) may not in fact be in the subset X. In other words, in examples, the image encoder is configured, in dependence upon the aspect of the image region, to inhibit encoding of prediction directions in some but not all of the complementary sub-groups and, in the case of a prediction direction not in the one or more sub-groups to be encoded, to map the prediction direction to a nearest prediction direction in the aspect of the image region. FIG. 19 provides one example of a technique for achieving this.

Referring to FIG. 19, a step 1230 takes the place of the step 1160 in FIG. 17. At the step 1230, it is determined whether the mode selected at the step 1120 (and which is not a most probable mode, as detected by the step 1130) is in the subset X. If yes, then the mode is encoded at a step 1240 which corresponds to the step 1170 of FIG. 17. If the answer is no, then the selected mode is changed to the nearest available mode (in the angular domain) which is within the subset X, at a step 1250 (for example, by choosing the nearest available neighbour in the subset X if a single nearest neighbour exists, or by selecting (for example) the next lowest numbered mode in the subset X if two equidistant modes exist. Then at a step 1260 that newly selected mode is encoded.

Figure 20:
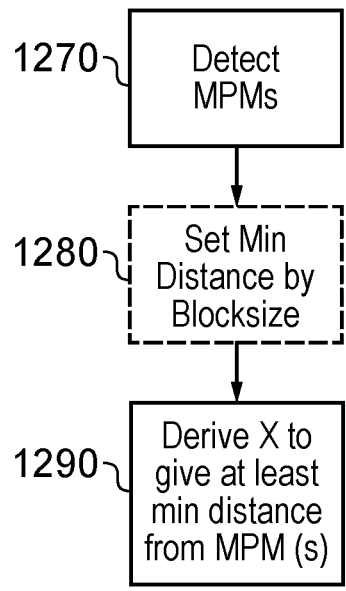
FIG. 20 is a schematic flowchart illustrating an encoding technique.

FIG. 20 is a schematic flow chart which, in the context of a system only using the subset X, provides a technique to allow the modes contained within the subset X to be potentially more useful than a simple arbitrary choice of a starting point for the modes of subset X would otherwise give.

As mentioned above, in examples, the subset X comprises every fourth (or every nth) mode of the remaining (not most probable) modes, arranged in numerical order. While the starting point for this one-in-n selection can be set arbitrarily (as long as it is set in the same way at the encoded and the decoder), in FIG. 20 the starting point is set so as to provide the greatest distance (for example, angular distance), or at least achieve a minimum required angular distance, from one or more of those modes selected as most probable modes. This means that even with the reduced number of available modes provided by restricting to the subset X, a useful spread of angles can still be provided for.

The steps shown in FIG. 20 comprise part of the functionality of the step 1150 of FIG. 17. At a step 1270, the one or more (previously chosen—at the step 1110) most probable modes are detected. At an optional step 1280, a minimum distance is established according to the block size of the current block. For example, a greater minimum distance could be applied to so-called small blocks. Then, at a step 1290, the subset X is derived so as to give at least the minimum distance between the most probable modes and any member of the subset X.

Therefore, in examples, the image encoder is configured to select the complementary sub-groups so the prediction directions in the one or more sub-groups to be encoded have at least a threshold angular separation from the detected likely prediction directions. The threshold angular separation may optionally be dependent (at the step 1280) upon the aspect of the image region.

Figure 21:
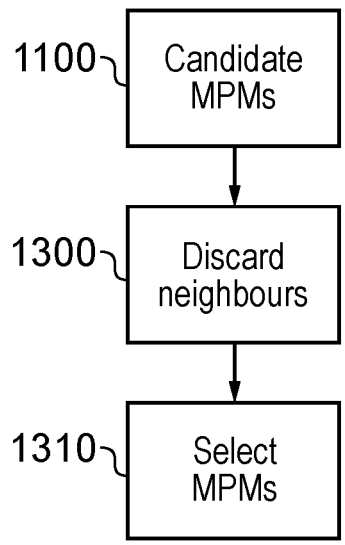
FIG. 21 is a schematic flowchart illustrating an encoding technique.

FIG. 21 is a schematic flow chart relating to the selection of most probable modes at the step 1110 of FIG. 17. Starting with the candidate most probable modes established at the step 1100, if there are neighbouring modes amongst the set of candidate most probable modes then one of each pair of neighbouring modes is disregarded from the candidate set at a step 1300 and, at a step 1310 (corresponding in parts to the step 1110 of FIG. 17) most probable modes are selected from the modified candidate list as changed by the step 1300. This technique can avoid selecting, as two or more most probable modes, very similar angular modes. Therefore, in examples, the image encoder is configured, in the detection of likely prediction directions, to impose a minimum angular separation between the likely prediction directions.

Figure 22:
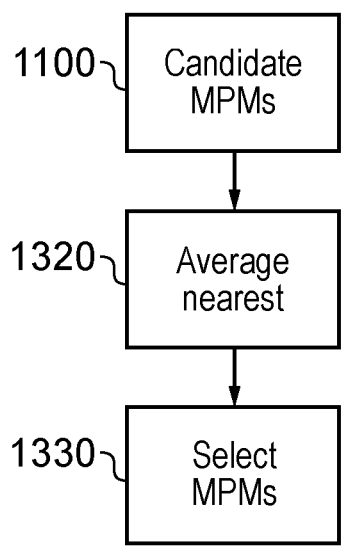
FIG. 22 is a schematic flowchart illustrating an encoding technique.

FIG. 22 is a schematic flow chart relating to the selection of most probable modes at the step 1110 of FIG. 17. Starting with the candidate most probable modes established at the step 1100, at a step 1320 the angularly nearest MPM candidates are detected and an average of their two angles is taken. This can be achieved by, for example, taking an arithmetic mean of their mode number (using the example numbering scheme of FIG. 11) and then rounding to the nearest integer, or (in another example) to the next higher or next lower integer. This averaged mode then forms a candidate MPM in place of the two modes from which it was derived. It is passed to the mode selection step 1330 (which corresponds in parts to the step 1110 of FIG. 17).

Figure 23:
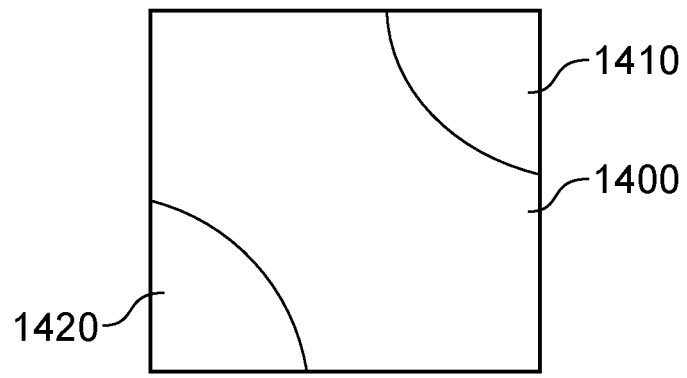
FIG. 23 schematically illustrates an encoding block.

In other examples, which may or may not be combined with the examples discussed elsewhere in this document, the set of candidate prediction directions for a sample can vary with sample pulsation within a block or region. As an example, FIG. 23 schematically illustrates a block 1400 having sub-regions (shown schematically as sub-regions 1410, 1420) in which the set of available prediction directions may be different in their number and/or their distribution or weighting of distribution of possible directions compared to one or both of the other sub-region and the central part of the block (not falling in either sub-region). For example, sub-regions as shown in FIG. 23 may, by virtue of their position within the block, be more likely to be associated with certain ranges of prediction direction and so, in a similar manner to FIGS. 15 and 16 discussed above, a subset of prediction directions weighted according to the likely angular range can be provided in each case. This therefore provides an example of the image encoder being configured to vary sets of candidate prediction directions applicable to a sample in dependence upon the position of that sample within the image region.

Figure 24:
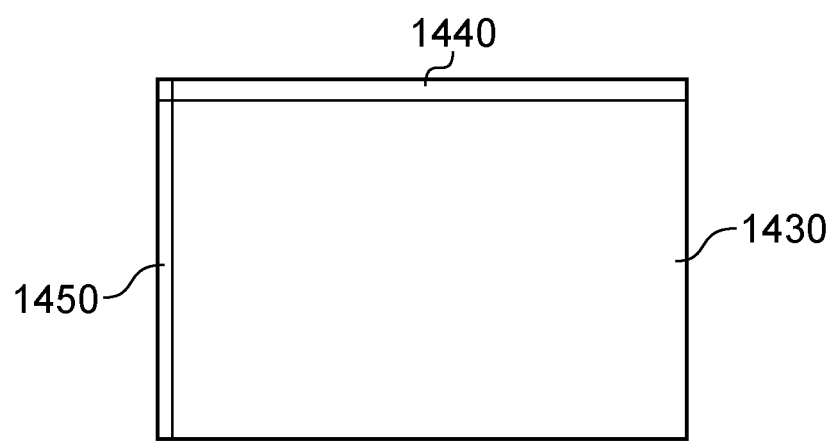
FIG. 24 schematically illustrates an image.

In other examples, which may or may not be combined with the examples discussed elsewhere in this document, the set of available prediction directions can be varied according to the position of the block or region within the image. FIG. 24 schematically illustrates an image 1430. Blocks in a top row 1440 use identical or dummy reference samples for the samples above them, because real image samples are not available outside the extent of the image, and blocks in a left column 1450 use identical or dummy reference samples for the samples to their left. So in the case of the row 1440 there is little or no point having a fine resolution of upward-pointing prediction directions, and for the column 1450 there is little or no point having a fine resolution of leftward-pointing prediction directions. In each of these examples situations the set of available prediction directions can be reduced (so as to reduce the number of upward pointing directions for blocks in the row 1440 and the number of leftward-pointing regions for blocks in the column 1450).

Therefore FIG. 24 provides an example in which the aspect comprises at least the region position within the image. For example, for image regions which are at the periphery of the image and for which dummy or repeated reference samples are used, the set of candidate prediction directions is weighted towards a range of prediction directions not pointing towards the dummy or repeated reference samples.

Figure 25:
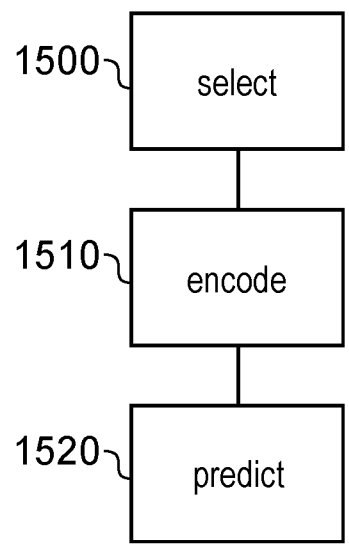
FIGS. 25-28 are schematic flowcharts illustrating methods.

FIG. 25 is a schematic flowchart illustrating a method comprising:

selecting (at a step 1500) at least one of the size and the shape of each image region of a plurality of image regions of an image;

encoding (at a step 1510) the image as the plurality of image regions; and intra-image predicting (at a step 1520) a current sample of a current region of the image with respect to one or more reference samples of the same image according to a prediction direction between the current sample and a reference position amongst the reference samples.

Figure 26:
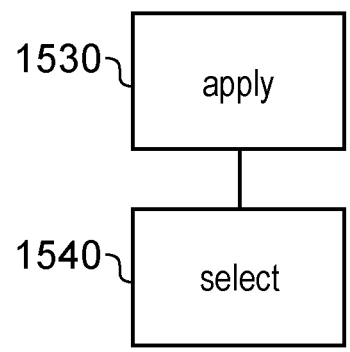

According to a schematic flowchart of FIG. 26, in at least examples, the predicting step 1520 comprises:

applying (at a step 1530) two or more different sets of candidate prediction directions to a given image region in dependence upon an aspect of the given image region, the aspect being one of more of: the region shape and the position of the given image region within the image (optionally with the region size as well); and selecting (at a step 1540) the prediction direction for a sample in the given image region from the set of the candidate prediction directions applicable to that image region.

Figure 27:
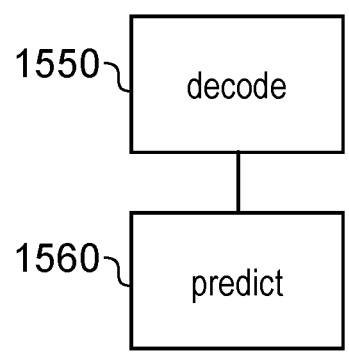

FIG. 27 is a schematic flowchart illustrating a method comprising:

decoding (at a step 1550) an image as a plurality of image regions each having a respective size and shape; and intra-image predicting (at a step 1560) a current sample of a current region of the image with respect to one or more reference samples of the same image according to a prediction direction between the current sample and a reference position amongst the reference samples.

Figure 28:
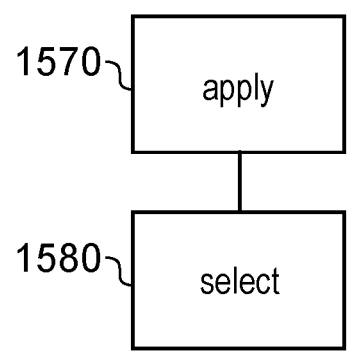

According to a schematic flowchart of FIG. 28, in at least examples, the predicting step 1560 comprises applying (at a step 1570) two or more different sets of candidate prediction directions to a given image region in dependence upon an aspect of the given image region, the aspect being one of more of: the region shape and the position of the given image region within the image (optionally with the region size as well); and selecting (at a step 1580) the prediction direction for a sample in the given image region from the set of the candidate prediction directions applicable to that image region.

Respective features of embodiments of the disclosure are defined by the following numbered clauses:

1. An apparatus comprising:

an image encoder to encode an image as a plurality of image regions, the image encoder selecting at least one of the size and the shape of each image region; and an intra-image predictor to predict a current sample of a current region of an image with respect to one or more reference samples of the same image according to a prediction direction between the current sample and a reference position amongst the reference samples;

in which the prediction direction is selected from a set of candidate prediction directions;

the intra-image predictor being configured to apply two or more different sets of candidate prediction directions in dependence upon an aspect of the image region, the aspect being one of more of: the region shape and the position of the region within the image.

2. Apparatus according to clause 1, in which the aspect further comprises at least the region size;

the intra-image predictor being configured to apply a smaller set of candidate prediction directions to smaller image regions and to apply a larger set of candidate prediction directions to larger image regions.

3. Apparatus according to clause 2, in which the image predictor is configured to apply a smaller set of candidate prediction directions to image regions having at least one dimension of a threshold size or lower.

4. Apparatus according to any one of clauses 1 to 3, in which the aspect comprises at least the region shape;

the intra-image predictor being configured to apply a smaller set of candidate prediction directions to non-square image regions and to apply a larger set of candidate prediction directions to square image regions.

5. Apparatus according to clause 4, in which the smaller set of candidate prediction directions for a non-square image region is weighted towards a range of prediction directions dependent upon the orientation of the non-square image region.

6. Apparatus according to any one of the preceding clauses, in which the image encoder is configured to encode data identifying the prediction direction selected for each sample or region of the image.

7. Apparatus according to clause 6, in which the image encoder is configured to detect one or more likely prediction directions in response to those commonly used for one or more previously encoded image regions and to encode the data identifying the prediction direction as either: (i) data indicating that the prediction direction is a detected likely prediction direction, or (ii) data identifying the prediction direction amongst the remaining candidate prediction directions.

8. Apparatus according to clause 7 in which, for a given image region having a smaller set of candidate prediction directions than one or more other image regions, the image encoder is configured, when a detected likely prediction direction is not part of the set of candidate prediction directions applicable to the given image region, to map the detected likely prediction direction to an adjacent prediction direction within the set applicable to the given image region.

9. Apparatus according to clause 7 or clause 8, in which the data (ii) identifying the prediction direction amongst the remaining candidate prediction directions comprises an indication of whether the prediction direction is in one of two or more differently-sized complementary sub-groups of the remaining candidate prediction directions.

10. Apparatus according to clause 9, in which the image encoder is configured, in dependence upon the aspect of the image region, to inhibit encoding of prediction directions in some but not all of the complementary sub-groups and, in the case of a prediction direction not in the one or more sub-groups to be encoded, to map the prediction direction to a nearest prediction direction in the aspect of the image region.

11. Apparatus according to clause 9 or clause 10, in which the image encoder is configured to select the complementary sub-groups so the prediction directions in the one or more sub-groups to be encoded have at least a threshold angular separation from the detected likely prediction directions.

12. Apparatus according to clause 11, in which the threshold angular separation is dependent upon an aspect of the image region.

13. Apparatus according to any one of clauses 7 to 12, in which the image encoder is configured, in the detection of likely prediction directions, to impose a minimum angular separation between the likely prediction directions.

14. Apparatus according to any one of the preceding clauses, in which the aspect comprises at least the region position within the image.

15. Apparatus according to clause 14, in which, for image regions which are at the periphery of the image and for which dummy or repeated reference samples are used, the set of candidate prediction directions is weighted towards a range of prediction directions not pointing towards the dummy or repeated reference samples.

16. Apparatus according to any one of the preceding clauses, in which the image encoder is configured to vary sets of candidate prediction directions applicable to a sample in dependence upon the position of that sample within the image region.

17. Video storage, capture, transmission or reception apparatus comprising apparatus according to any one of the preceding clauses.

18. An apparatus comprising:
an image decoder to decode an image as a plurality of image regions each having a respective size and the shape; and
an intra-image predictor to predict a current sample of a current region of an image with respect to one or more reference samples of the same image according to a prediction direction between the current sample and a reference position amongst the reference samples;
in which the prediction direction is selected from a set of candidate prediction directions;
the intra-image predictor being configured to apply two or more different sets of candidate prediction directions in dependence upon an aspect of the image region, the aspect being one of more of: the region shape and the position of the region within the image.

19. Video storage, capture, transmission or reception apparatus comprising apparatus according to clause 18.

20. A method comprising:
selecting at least one of the size and the shape of each image region of a plurality of image regions of an image;
encoding the image as the plurality of image regions; and
intra-image predicting a current sample of a current region of the image with respect to one or more reference samples of the same image according to a prediction direction between the current sample and a reference position amongst the reference samples, the predicting step comprising:
applying two or more different sets of candidate prediction directions to a given image region in dependence upon an aspect of the given image region, the aspect being one of more of: the region shape and the position of the given image region within the image; and
selecting the prediction direction for a sample in the given image region from the set of the candidate prediction directions applicable to that image region.

21. Computer software which, when executed by a computer, causes the computer to carry out a method according to clause 20.

22. A machine-readable non-transitory storage medium which stores software according to clause 21.

23. A method comprising:
decoding an image as a plurality of image regions each having a respective size and shape; and
intra-image predicting a current sample of a current region of the image with respect to one or more reference samples of the same image according to a prediction direction between the current sample and a reference position amongst the reference samples, the predicting step comprising:
applying two or more different sets of candidate prediction directions to a given image region in dependence upon an aspect of the given image region, the aspect being one of more of: the region shape and the position of the given image region within the image; and
selecting the prediction direction for a sample in the given image region from the set of the candidate prediction directions applicable to that image region 24. Computer software which, when executed by a computer, causes the computer to carry out a method according to clause 23.

25. A machine-readable non-transitory storage medium which stores software according to clause 24.

26. A data signal comprising coded data generated according to the method of clause 20.

The techniques discussed above can apply in isolation to one or more components of a video sampling scheme, for example when luminance and or chrominance and/or components of chrominance samples are differently sampled.

Also the techniques need not necessarily be applied to all 4×4 (or "small") blocks within an image. In some examples, for any one particular image it is not necessary for the intra-image predictor to apply the same set of candidate prediction directions to all those image regions having a common aspect, such as size or shape. In embodiments, different set of candidate prediction directions may be applied to a subset of those image regions in the image having a common size or shape.

It will be appreciated that the various different techniques described can be combined so that the selection of the set of candidate modes applicable to a sample or to a block or region of samples can take into account any permutation of one or more (being a subset or the whole group) of considerations or aspects discussed above.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. An apparatus, comprising:
   circuitry configured to:
   divide an image into a plurality of image regions; and
   encode the image by processing the plurality of image regions, including performing, for a current image region of the plurality of image regions that is to be encoded using an intra prediction:
   determining a plurality of subsets of candidate prediction directions according to at least a size of the current image region, a size of any of the plurality of subsets of candidate prediction directions, when the current image region is determined to be a smaller region, being smaller than a size of any of the plurality of subsets of candidate prediction directions when the current image region is determined not to be the smaller region,
   identifying a current subset of candidate prediction directions from the plurality of subsets of candidate prediction directions according to the size and a shape of the current image region,
   selecting a current prediction direction from the current subset of candidate prediction directions, and
   intra-image predicting a current sample of the current image region according to the current prediction direction.

2. The apparatus according to claim 1, wherein the circuitry is further configured to determine that the current image region is the smaller region when at least one dimension of the current image region is equal to or smaller than a threshold size.

3. The apparatus according to claim 1, wherein the circuitry is further configured to, then the current image region is determined to be non-square, determine the plurality of subsets of candidate prediction directions that is weighted towards a range of prediction directions dependent upon an orientation of the current image region.

4. The apparatus according to claim 1, wherein the circuitry is configured to:
   detect one or more likely prediction directions according to one or more prediction directions used for one or more previously encoded image regions; and
   encode data that:
   (i) indicates that the current prediction direction is selected from the one or more likely prediction directions, or
   (ii) identifies the current prediction direction amongst remaining candidate prediction directions that are not included in the one or more likely prediction directions.

5. The apparatus according to claim 4, wherein the circuitry is configured to, when the current subset of candidate prediction directions for the current image region is a smaller subset of candidate prediction directions than one or more other image regions, and when a detected likely prediction direction for the current image region is not part of the current set of candidate prediction directions for the current image region, select the current prediction direction from the current subset of candidate prediction directions by mapping the detected likely prediction direction to an adjacent prediction direction within the current subset of candidate prediction directions.

6. The apparatus according to claim 4, wherein the data that identifies the current prediction direction amongst the remaining candidate prediction directions comprises an indication of whether the current prediction direction is in one of two or more differently-sized complementary sub-groups of the remaining candidate prediction directions.

7. The apparatus according to claim 6, wherein the circuitry is configured to:
   inhibit encoding of prediction directions in some but not all of the complementary sub-groups according to the size or the shape of the current image region; and
   in a case of an initially selected prediction direction not in one or more complementary sub-groups to be encoded, map the initially selected prediction direction to a nearest prediction direction in the one or more complementary sub-groups to be encoded.

8. The apparatus according to claim 7, wherein the circuitry is configured to:
   select the one or more complementary sub-groups to be encoded so the prediction directions in the one or more complementary sub-groups to be encoded have at least a threshold angular separation from the detected one or more likely prediction directions.

9. The apparatus according to claim 8, wherein the threshold angular separation is dependent upon the size or the shape of the current image region.

10. The apparatus according to claim 4, wherein the circuitry is configured to impose a minimum angular separation between the detected one or more likely prediction directions.

11. The apparatus according to claim 1, wherein the identifying the current subset of candidate prediction directions for the current image region is performed further according to a position of the current image region within the image.

12. The apparatus according to claim 11, wherein the circuitry is further configured to, when the current image region is at a periphery of the image and when dummy or repeated reference samples are used, determine the plurality of subsets of candidate prediction directions that is weighted towards a range of prediction directions not pointing towards the dummy or repeated reference samples.

13. The apparatus according to claim 1, wherein the circuitry is configured to vary the current subset of candidate prediction directions according to a position of the current sample within the current image region.

14. An apparatus, comprising:
  circuitry configured to:
    identify a plurality of image regions of an image; and
    decode the image by processing the plurality of image regions, including performing, for a current image region of the plurality of image regions that is to be decoded using an intra prediction:
      determining a plurality of subsets of candidate prediction directions according to at least a size of the current image region, a size of any of the plurality of subsets of candidate prediction directions, when the current image region is determined to be a smaller region, being smaller than a size of any of the plurality of subsets of candidate prediction directions when the current image region is determined not to be the smaller region,
      identifying a current subset of candidate prediction directions from the plurality of subsets of candidate prediction directions according to the size and a shape of the current image region,
      selecting a current prediction direction from the current subset of candidate prediction directions, and
      intra-image predicting a current sample of the current image region according to the current prediction direction.

15. A video storage, capture, transmission, or reception apparatus comprising the apparatus according to claim 14.

16. The apparatus according to claim 14, wherein the circuitry is further configured to determine that the current image region is the smaller region when at least one dimension of the current image region is equal to or smaller than a threshold size.

17. A method, comprising:
  dividing an image into a plurality of image regions; and
  encoding the image by processing the plurality of image regions, including performing, for a current image region of the plurality of image regions that is to be encoded using an intra prediction:
    determining a plurality of subsets of candidate prediction directions according to at least a size of the current image region, a size of any of the plurality of subsets of candidate prediction directions, when the current image region is determined to be a smaller region, being smaller than a size of any of the plurality of subsets of candidate prediction directions when the current image region is determined not to be the smaller region,
    identifying a current subset of candidate prediction directions from the plurality of subsets of candidate prediction directions according to the size and a shape of the current image region,
    selecting a current prediction direction from the current subset of candidate prediction directions, and
    intra-image predicting a current sample of the current image region of the image according to the current prediction direction.

18. A non-transitory computer readable medium including computer program instructions, which when executed by a computer, cause the computer to perform the method of claim 17.

19. The method according to claim 17, further comprising determining that the current image region is the smaller region when at least one dimension of the current image region is equal to or smaller than a threshold size.

20. A method, comprising:
  identifying a plurality of image regions of an image; and
  decoding the image by processing a plurality of image regions, including performing, for a current image region of the plurality of image regions that is to be decoded using an intra prediction;
    determining a plurality of subsets of candidate prediction directions according to at least a size of the current image region, a size of any of the plurality of subsets of candidate prediction directions, when the current image region is determined to be a smaller region, being smaller than a size of any of the plurality of subsets of candidate prediction directions when the current image region is determined not to be the smaller region,
    identifying a current subset of candidate prediction directions from the plurality of subsets of candidate prediction directions according to the size and a shape of the current image region,
    selecting a current prediction direction from the current subset of candidate prediction directions, and
    intra-image predicting a current sample of the current image region of the image according to the current prediction direction.

21. A non-transitory computer readable medium including computer program instructions, which when executed by a computer, cause the computer to perform the method of claim 20.

22. The method according to claim 20, further comprising determining that the current image region is the smaller region when at least one dimension of the current image region is equal to or smaller than a threshold size.

* * * * *